(12) United States Patent
Lomax, Jr. et al.

(10) Patent No.: US 8,128,737 B2
(45) Date of Patent: Mar. 6, 2012

(54) ABSORBING PAHS FROM GAS STREAMS (75) Inventors: Franklin D. Lomax, Jr., Boyds, MD (US); Owens Owen, Arlington, VA (US); Paul Bizot, Bethesda, MD (US); Milan Skarka, Springfield, VA (US)

(73) Assignee: Lummus Technology Inc., Bloomfield, NJ (US)

( * ) Notice: Subject to any disclaimer, the term of this patent is extended or adjusted under 35 U.S.C. 154(b) by 15 days.

(21) Appl. No.: 12/349,778

(22) Filed: Jan. 7, 2009

(65) Prior Publication Data
US 2009/0173226 A1  Jul. 9, 2009

Related U.S. Application Data (60) Provisional application No. 61/019,512, filed on Jan. 7, 2008.

(51) Int. Cl.
*B01D 47/00* (2006.01)
(52) U.S. Cl. .......... 95/159; 95/191; 95/207; 95/218; 96/234; 96/268; 96/281

(58) Field of Classification Search .......... 95/187, 95/218, 159, 191, 207; 96/234, 268, 281
See application file for complete search history.

(56) References Cited

U.S. PATENT DOCUMENTS

| | | |
|---|---|---|
| 4,844,721 A | 7/1989 | Cox et al. |
| 5,955,037 A | 9/1999 | Hoist et al. |
| 2003/0101869 A1 | 6/2003 | Baudry et al. |
| 2008/0120991 A1* | 5/2008 | Inoue et al. .......... 62/470 |

OTHER PUBLICATIONS

U.S. Appl. No. 12/939,840, filed Nov. 4, 2010, Lomax, et al.

* cited by examiner

*Primary Examiner* — Duane Smith
(74) *Attorney, Agent, or Firm* — Alix, Yale & Ristas, LLP (57) ABSTRACT A system, method and apparatus for treating a waste gas stream containing on or more hydrocarbon contaminants such polycyclic aromatic hydrocarbons (PAH). The system, method and apparatus may include a heat treatment chamber having a recycling apparatus that includes a supply of a food oil solvent; a mixing device to mix the solvent with the waste gas stream. The system, method and apparatus dissolve the hydrocarbon contaminants from the gas stream into a solvent containing the food oil.

20 Claims, 3 Drawing Sheets

ABSORBING PAHS FROM GAS STREAMS

BACKGROUND OF THE INVENTION

1. Field of the Invention

The present invention relates to the removal of contaminants entrained in a gas stream.

2. Discussion of the Background

Many different types of manufacturing plants produce exhaust gases that have pollutants, such as polycyclic aromatic hydrocarbons (PAH), entrained in the stream of exhaust gases. Streams of exhaust gases from manufacturing plants can contain hydrocarbons such as oils, petroleum fractions, benzenes, and solvents. There are numerous examples of exhaust gas streams from manufacturing plants that contain PAH, such as spent protective atmosphere gases, coke oven gas, and various refinery waste streams.

The presence of such pollutants in exhaust gas streams raises several issues for consideration when determining how to deal with or utilize the exhaust gas stream. Such pollutants raise environmental concerns in situations where venting of the exhaust gases into the surrounding atmosphere is considered. At many locations, the emission of pollutants into the atmosphere is regulated, and extra emissions may be strictly prohibited, requiring the addition of expensive post-treatment equipment, such as thermal or catalytic oxidizers. Additionally, in some circumstances, the exhaust gases might be considered for recovery and recycling, in order to reuse the exhaust gases as fuel in the manufacturing plant or for other purposes. However, due to the pollutants in the exhaust gases, the fuel value of the recovered exhaust gases may be low. Therefore, it may be necessary to remove the pollutants from the exhaust gases before discharging the exhaust gases into the atmosphere, or before reusing the exhaust gases as a fuel or process feedstock.

Pollutants that are entrained in the exhaust stream in the liquid phase in the form of large droplets can be separated from the exhaust stream by using baffle separators, cyclones, demisters, electric separators, or similar devices. These devices are capable of separating particles as small as 0.5 μm. However, it has proven to be difficult to separate out pollutants that are entrained in the exhaust stream in the gaseous phase or even in ultra fine droplets. Activated carbon can be used to remove gaseous pollutants from gas streams. However, when dealing with large quantities of exhaust gases that can contain large amounts of pollutants (e.g. exhaust gases of a steel annealing plant), the use of filters that contain active carbon can be unfeasible. Firstly, filters that contain active carbon are extremely expensive. Additionally, several kilograms of pollutants can clog even a large carbon filter rendering it unsuitable for use, so that frequent change of filters becomes necessary and the removal of spent filter content becomes a problem.

BRIEF SUMMARY OF THE INVENTION

In an effort to eliminate the limitations and problems discussed above, the inventors have constructed a method and system for gas recycling as described below.

The present invention provides a method and apparatus for removing hydrocarbons from a gas stream.

The present invention further provides a method and apparatus for scrubbing contaminant hydrocarbons from a contaminant-containing gas stream using a gas recycling apparatus, as well as providing lubrication for components in the gas recycling apparatus.

The present invention advantageously provides a method and apparatus for recycling used scrubbing solvent contaminated with decomposition byproducts from waste gas streams, thereby increasing the solvent's usage prior to removal of the solvent as waste solvent.

The present invention advantageously provides solvents by which hydrocarbons present in a used gas stream can be dissolved or entrained, and solvents that are capable of being economically purified.

The present invention advantageously provides a system and method for treating a waste gas stream by dissolving or entraining hydrocarbons present in the used gas stream in a solvent that includes food oils.

The present invention may be advantageously applied to spent protective atmospheres gases and metallurgical gases such as coke oven or producer gas.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DETAILED DESCRIPTION OF THE INVENTION

Embodiments of the present invention are described hereinafter with reference to the accompanying drawings. In the following description, the constituent elements having substantially the same function and arrangement are denoted by the same reference numerals, and repetitive descriptions will be made only when necessary.

The present invention relates to any process requiring recovery or removal of vapor or aerosol hydrocarbons, in particular PAH, from gases. Gaseous streams of exhaust, which occur in manufacturing plants, can contain hydrocarbons such as oils, petroleum fractions, benzenes, and solvents. Examples of streams containing PAH are spent protective atmosphere gases, coke oven gas, and various refinery waste streams. In those cases in which catalytic post-combustion methods, which are known to exist, are unfeasible, a new method for removing hydrocarbons such as PAHs from waste gas is necessary.

Figure 1:
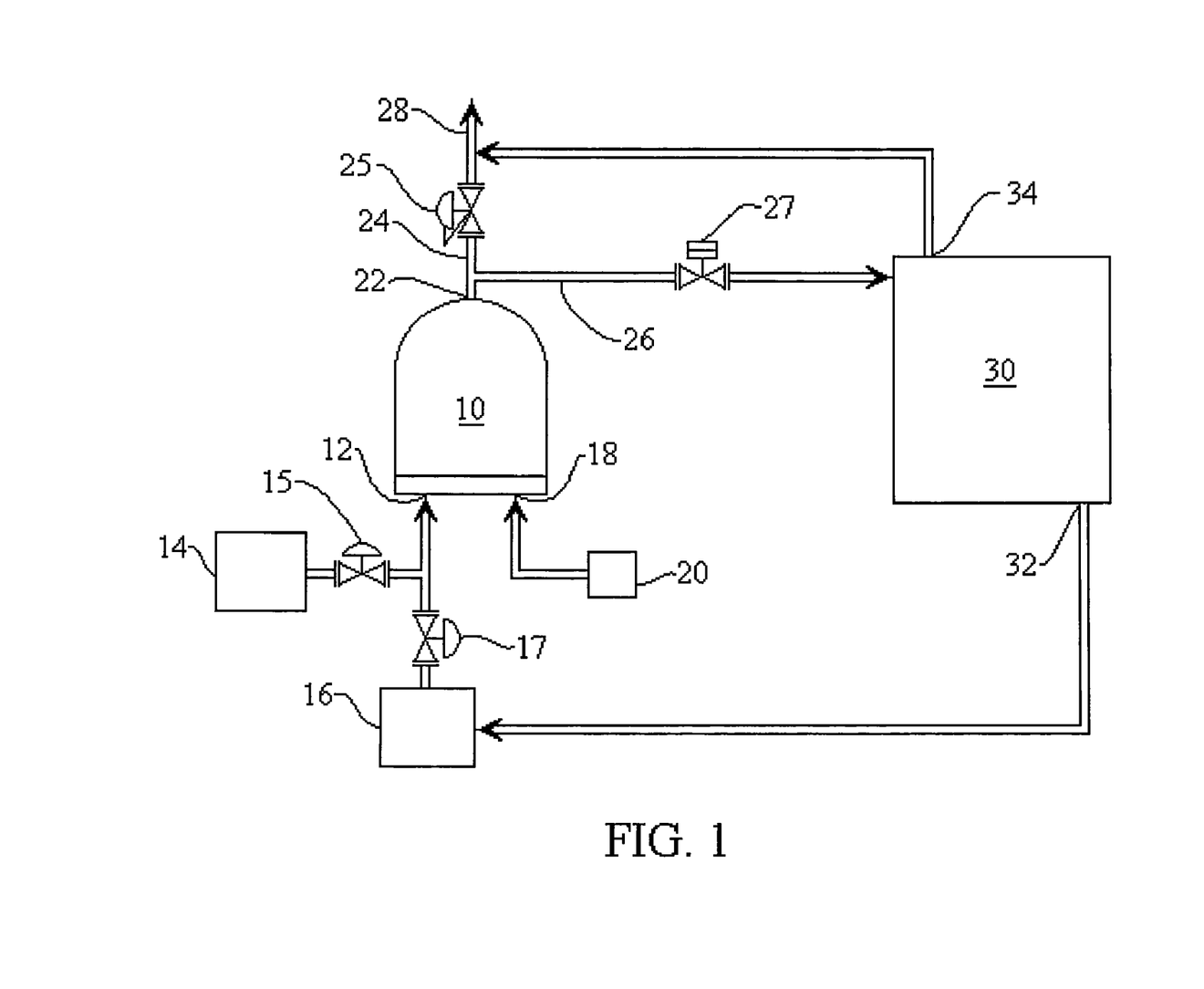
FIG. 1 is a schematic diagram of a heat treatment furnace that utilizes a protective gaseous atmosphere and an atmosphere recycling apparatus for use with the furnace.

FIG. 1 depicts an embodiment of a system in which the present invention can be incorporated and advantageously utilized. In FIG. 1, a heat treatment furnace 10 is supplied with a protective atmosphere gas from two sources, which are either used individually or in unison, and include a fresh gas supply tank 14 storing fresh protective atmosphere and a recycled gas supply tank 16 storing recycled protective atmosphere gas. The flow of gas from the fresh gas supply tank 14 to the furnace 10 is regulated using valve 15, and the flow of gas from the recycled gas supply tank 16 to the furnace is regulated using valve 17. Alternately, the recycle may be configured as in U.S. application Ser. Nos. 11/407,058 and 11/749,521, each of which is incorporated herein by reference in its entirety. The heat treatment furnace 10 is also supplied with heat by combustion of fuel supplied from fuel supply 20, or alternatively can be electrically heated.

The used or waste protective atmosphere is exhausted from the furnace 10 via outlet 22, and can be directed along piping 24 to vent piping 28, where the used protective atmosphere is vented into the surrounding environment after any needed environmental cleaning is performed thereon, and/or can directed along piping 26 to a recycling apparatus 30. A backpressure valve 25 is provided along piping 24 and an actuated valve 27 is provided along piping 26 in order to control the flow of the used protective atmosphere exiting the furnace 10 via outlet 22.

The recycling apparatus 30 receives the used protective atmosphere from piping 26. The recycling apparatus 30 generates from the used protective atmosphere a purified atmosphere gas stream that is discharged via outlet 32 and returned to the recycled gas supply tank 16, and an impure stream of gas that is discharged via outlet 34 and directed to vent piping 28 for discharge.

Figure 2:
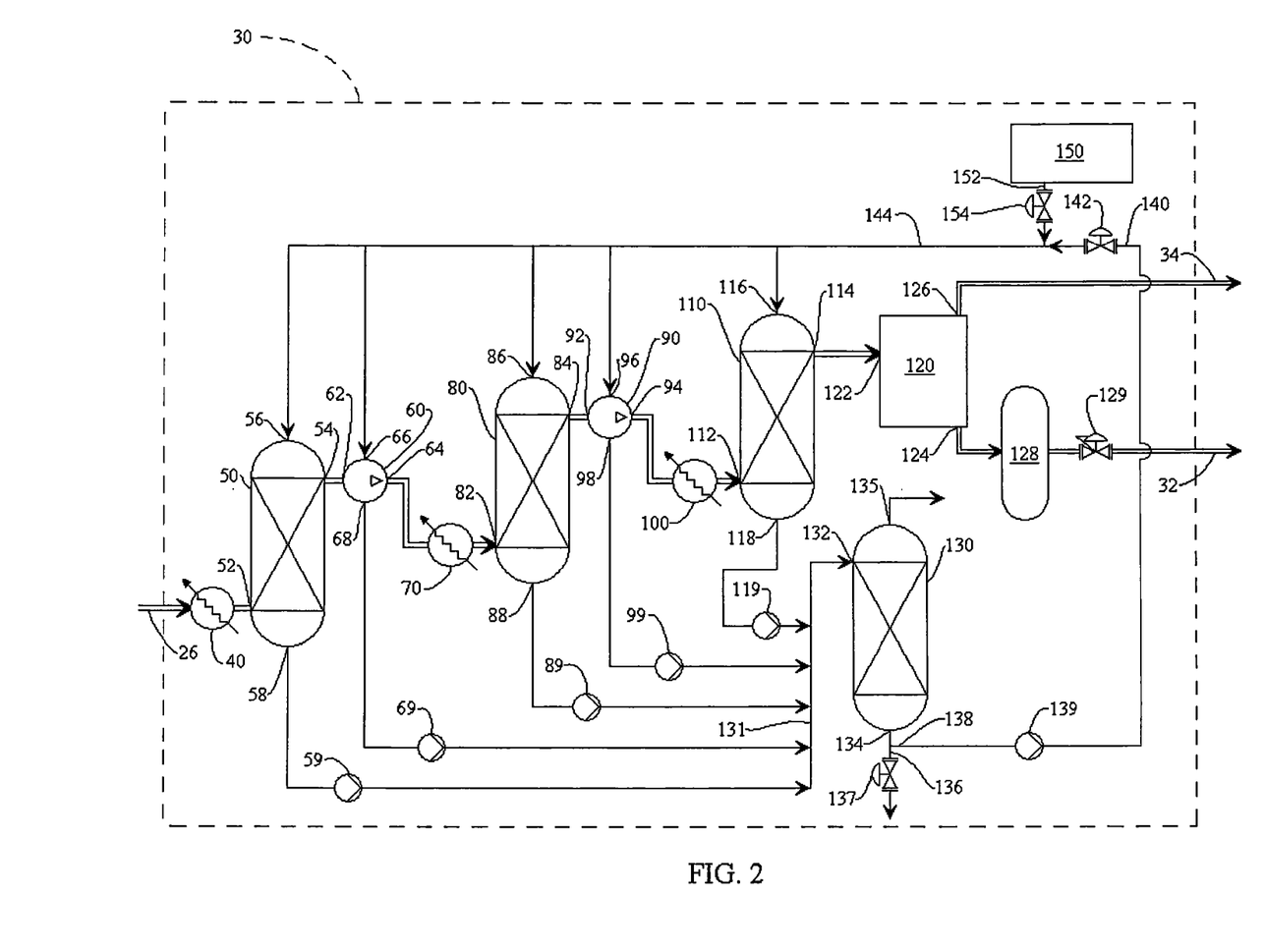
FIG. 2 is a schematic diagram of an embodiment of an atmosphere recycling apparatus according to the present invention.

FIG. 2 depicts an embodiment of the recycling apparatus 30 according to the present invention. In this embodiment, the used protective atmosphere received from piping 26 is directed through two stages of compression, using compressors 60 and 90, during which time contaminants in the gas stream of used protective atmosphere are removed from the gas stream using solvent, as will be discussed in detail below, to produce a scrubbed gas stream. The scrubbed gas stream can then be further cleansed by directing the scrubbed gas stream to a gas stream inlet 122 of a gas separator 120, such as a unit including one or more pressure swing adsorption (PSA) apparatus. The gas separator 120 produces a purified atmosphere gas stream via outlet 124 and an impure gas stream via outlet 126. The purified atmosphere gas stream is discharged via outlet 124 and can be directed to a buffer tank 128 in order to minimize pressure fluctuations, and can then be sent to a backpressure regulator valve 129 that can be used to impose a constant backpressure condition on the gas separator 120. Finally, the purified atmosphere gas stream is discharged from the recycling apparatus 30 via outlet 32 and recycled by sending the purified atmosphere gas stream to the recycled gas supply tank 16 (see FIG. 1).

As noted above, the used protective atmosphere received from piping 26 is directed through two stages of compression, during which time contaminants in the gas stream of used protective atmosphere are removed from the gas stream using solvent to produce a scrubbed gas stream. It is noted that this scrubbing process can be achieve using numerous different configurations. For example, while the embodiment depicted in FIG. 2 depicts two stages of compression, the invention can alternatively be incorporated into configurations that have one stage of compression, or configurations that have more than two stages of compression. The scrubbing operation may be carried out before the compression stages, between stages, or after the stages.

As depicted in FIG. 2, the used protective atmosphere received from piping 26 can be sent through a heat exchanger (or cooler) 40, which can be provided if desired in order to cool the gas stream to a desired suction temperature. The cooled gas stream is then sent to a gas stream inlet 52 of a first chamber 50, which acts as a pulsation buffering dampener by minimizing pressure fluctuations caused by suction of a first stage compressor 60 downstream thereof, and which acts as a contaminant scrubber. The first chamber 50 includes a solvent inlet 56 and a solvent outlet 58. The solvent is injected within the solvent inlet 56 of the first chamber 50, where the solvent is mixed with the flow of the gas stream traveling through the first chamber 50 entering at gas stream inlet 52 and exiting at gas stream outlet 54. Contaminants within the gas stream traveling through the first chamber 50 are entrapped by and/or dissolved within the solvent (the properties of which will be discussed in detail below) of the present invention due to the contact between the solvent and the gas stream. The solvent containing the contaminant pools at the bottom of the first chamber 50 and exits the first chamber 50 via solvent outlet 58. The solvent containing the contaminant can then be pumped using a pump 59 to a piping 131 connected to a stripping device 130 for removing the contaminants from the solvent, and the cleaned solvent is then recycled or discharged, as will be described below. In one embodiment of the present invention, the flow of fresh solvent from solvent inlet 56 is opposite or counter to the flow of gas entering from inlet 52. It is preferable that the scrubbing operation occurs at a temperature that is below 80° C. In one embodiment of the invention, the scrubbing operation occurs at a temperature between 50° C. and the lower limit at which the solvent/solute mixture may no longer be handled using a pump. In one embodiment of the present invention, the chamber 50 may be provided with internal mass-transfer features, such as random packings, structured packings, fibers, shot, granules, or other media which promote mass transfer.

The gas stream exiting the first chamber 50 is then sent to a gas stream inlet 62 of the first stage compressor 60. The first stage compressor 60 includes a solvent inlet 66 and a solvent outlet 68. The solvent is injected within the solvent inlet 66 of the first stage compressor 60, where the solvent is mixed with the flow of the gas stream traveling through the first stage compressor 60 entering at gas stream inlet 62 and exiting at gas stream outlet 64. The solvent injected into the first stage compressor 60 also acts as a lubricant for the first stage compressor 60, as will be described in detail below. Contaminants within the gas stream traveling through the first stage compressor 60 are entrapped by and/or dissolved within the solvent of the present invention due to the contact therebetween, and then the solvent containing the contaminant exits the first stage compressor 60 via solvent outlet 68. The solvent containing the contaminant can then be pumped using a pump 69 to the stripping device 130 or back to the first chamber 50 for removing the contaminants from the solvent, and the cleaned solvent is then recycled or discharged. The solvent contaminated with undesirable contaminants at any point may be recycled to any one of the lower-pressure chambers containing spent solvent, and thus be concentrated in as few as one stream for transfer to the stripping apparatus 130.

The gas stream exiting the first stage compressor 60 can be sent through a heat exchanger (or cooler) 70 if desired. The gas stream is then sent to a gas stream inlet 82 of a second chamber 80, which acts as a pulsation buffering dampener by minimizing pressure fluctuations caused by suction of a second stage compressor 90 downstream thereof, and which acts as a contaminant scrubber. An exemplary form of construction of the assembly of the buffer vessels and heat exchanger is disclosed in any of U.S. application Ser. Nos. 11/407,058; 11/749,521; and 11/780,945, each of which is incorporated herein by reference in its entirety. The second chamber 80 may be constructed in much the same manner as the first chamber 50, and thus includes a solvent inlet 86, a solvent outlet 88, gas stream inlet 82, and a gas stream outlet 84. Contaminants within the gas stream traveling through the second chamber 80 are entrapped by and/or dissolved within the solvent of the present invention due to the contact therebetween, and then the solvent containing the contaminant pools at the bottom of the second chamber 80 and exits via solvent outlet 88. The solvent containing the contaminant can then be pumped using a pump 89 to the stripping device 130 for removing the contaminants from the solvent, and the cleaned solvent is then recycled or discharged.

The gas stream exiting the second chamber 80 is then sent to a gas stream inlet 92 of the second stage compressor 90. The second stage compressor 90 includes a solvent inlet 96 and a solvent outlet 98. The solvent is injected within the solvent inlet 96 of the second stage compressor 90, where the solvent is mixed with the flow of the gas stream traveling through the second stage compressor 90 entering at gas stream inlet 92 and exiting at gas stream outlet 94. The solvent injected into the second stage compressor 90 also acts as a lubricant for the second stage compressor 90. Contaminants within the gas stream traveling through the second stage compressor 90 are entrapped by and/or dissolved within the solvent of the present invention due to the contact therebetween, and then the solvent containing the contaminant exits the first stage compressor 90 via solvent outlet 98. The solvent containing the contaminant can then be pumped using a pump 99 to the stripping device 130 for removing the contaminants from the solvent, and the cleaned solvent is then recycled or discharged. As previously disclosed, the spent solvent containing dissolved solute impurities may alternatively be sent to any vessel at a lower pressure, such as vessel 50.

The gas stream exiting the second stage compressor 90 can be sent through a heat exchanger (or cooler) 100 if desired. The gas stream is then sent to a gas stream inlet 112 of a third chamber 110, which acts as a pulsation buffering dampener, and which acts as a contaminant scrubber. The third chamber 110 is constructed in much the same manner as the first chamber 50 and the second chamber 80, and thus includes a solvent inlet 116, a solvent outlet 118, gas stream inlet 112, and a gas stream outlet 114. Contaminants within the gas stream traveling through the third chamber 110 are entrapped by and/or dissolved within the solvent of the present invention due to the contact therebetween, and then the solvent containing the contaminant pools at the bottom of the third chamber 110 and exits via solvent outlet 118. The solvent containing the contaminant can then be pumped using a pump 119 to the stripping device 130 for removing the contaminants from the solvent, and the cleaned solvent is then recycled or discharged.

The gas stream exiting the third chamber 110 is then sent to the gas stream inlet 112 of the gas separator 120, if such a device is used for further cleaning the scrubbed gas stream.

As noted above, the solvent containing the contaminant can be collected at the various discharge points, namely solvent outlets 58, 68, 88, 98, and 118, and then pumped to the piping 131 that is connected to the stripping device 130 for removing the contaminants from the solvent, and then either for recycling or discharge. Alternatively, each individual discharge point can be provided with its own stripping device, or various groupings of discharge points can be provided with their own stripping device, as desired or needed.

The stripping device 130 has a solvent inlet 132 connected to the piping 131, and a solvent outlet 134. The stripping device 130 separates out gaseous forms of contaminants in the solvent containing the contaminant and the gaseous contaminants that are separated out of the solvent containing the contaminant can be discharged from gas outlet 135 for disposal or other use. The cleaned solvent that is discharged via solvent outlet 134 can disposed of via piping 136 as controlled by valve 137, and/or can be reused via piping 138. The removal of contaminant is aided by operating at elevated temperatures. In one embodiment, the stripping operation is carried out at 70° C. or higher. In another embodiment, the stripping operation is carried out at 80° C. but below the flash point of the solvent or contaminants.

The removal of contaminants may be aided by providing a second material stream to dilute the contaminant vapor. This stream may be air, inert gas, waste gas from the recycler from point 34, or steam. The second material stream, referred to here as the stripping stream, is desirably provided in a direction opposite to or counter to the flow of the contaminated solvent. This stripping stream is desirably heated to a temperature above ambient. This heating may be by any means. In one embodiment of the present invention, the stripping media is heated by one or more of the heated compressor discharge streams 28, 48, 68.

The cleaned solvent being recycled via piping 138 is pumped using a pump 139 along a piping 140, and the flow of cleaned solvent along pipings 138 and 140 is controlled using valve 142. The solvent is then transferred along piping 144 and distributed to each of the various injection points, namely solvent inlets 56, 66, 86, 96, and 116. The flow of cleaned solvent from piping 140 can be supplemented with fresh solvent from a fresh solvent supply 150 via a piping 152 and controlled using a valve 154. The cleaned solvent discharged from 134 may be cooled before re-injection. In one embodiment, this cooling is achieved by exchanging heat with the dirty solvent flowing to inlet 132 in one or more heat exchangers provided for this purpose.

It should be noted that the solvent injection points and discharge points included in the embodiment depicted in FIG. 2 are merely one example of such points. Additional or fewer injection points, and additional or fewer discharge points can be provided if so desired. For example, components that are at upstream locations along the gas stream flow path from piping 26 to inlet 122 tend to be more susceptible to fouling by the contaminants in the gas stream, and therefore a higher number of injection and/or discharge points may be desirable in such upstream locations closer to piping 26, as compared to downstream locations closer to inlet 122. Additionally, injection points and discharge points can be provided at any point along the flow path, for example, in additional components not shown (e.g., additional buffer tanks, etc.), in conjunction with one or more of the coolers 40, 70, and/or 100, in various mixing devices that are configured to mix the solvent and the gas stream, and even at locations along the piping itself. Further, it is possible to provide a component or location with an injection point but not with a discharge point, and vice versa.

The embodiment in FIG. 2 includes numerous mixing devices that are used to remove contaminants from the gas stream, such as the chambers 50, 80, and 110, and the compressors 60 and 90. According to the invention, the recycling apparatus 30 should include one or more mixing apparatuses, where the scrubbing solvent, such as oil, and the dirty gas stream from the furnace 10 come into contact. The mixing devices can be any of: a spray atomizer such as an oil atomizer; a device where the solvent and gas stream flow over a packed bed or void vessel; a device where the solvent flows over compressor valves; a device for counter flowing the gas stream over the solvent; and/or a device for flooding the solvent over the gas stream as in a blower compressor. These and any other methods of increasing the surface area of contact between the solvent and the gas will prove beneficial.

In a configuration in which the solvent, such as oil, is supplied in conjunction with a compressor, as in compressors 60 and 90, the oil is used for lubricating, washing, and further scrubbing the earliest stage(s) of source gas compression. The washing and additional scrubbing is achieved by dripping the oil over the suction valve(s) of the air compressor(s) or injection into the inlet of a blower or a screw compressor. Once the oil has entered the gas compressor it takes on the role of lubricant.

The scrubbing solvent provided to the solvent injection points via piping 144 can be fresh oil (e.g., from a fresh supply source 150) or recycled oil (e.g., from stripping device 130 or other source of recycled oil). The oil can be recycled and reused if the dissolved PAH level is below acceptable saturation levels, as determined by sampling the discharged oil from piping 136 or at some other location. The recirculation of the oil continues until the oil has reached a predetermined degree of saturation. As the oil approaches the predetermined degree of saturation, the recirculated oil can be supplemented with fresh oil from source 150, and waste oil can be drained via piping 136. Oil samples collection from the piping 136 can allow for analysis of the waste oil to determine the degree of oil saturation. This information can used to determine necessity of oil replacement to maintain appropriate gas stream cleaning.

The present invention advantageously provides a method for removing vaporized decomposition byproducts from used or spent atmosphere gas prior to compression, for example, using the first chamber 50 as described above. The present invention also advantageously provides a method for recycling used scrubbing solvent contaminated with decomposition byproducts from waste gas streams increasing the new solvent's usage prior to removal as process waste, for example, using the stripper device 130 described above.

In those cases in which catalytic post-combustion methods, which are known to exist, are an unfeasible manner in which to cleanse used atmosphere gas streams, a new method for removing large hydrocarbons from waste gas is necessary. The present invention utilizes new solvents for decreasing the polycyclic aromatic hydrocarbons (PAH) concentration in waste gas streams. This method uses two processes for scrubbing PAH from a gas stream, as well as providing lubrication for components in the closed system.|

The present invention advantageously provides solvents by which large quantities of hydrocarbons in the used gas stream can be dissolved or entrained, and solvents that are capable of being purified and/or recycled at an economically allowable expense. The solvents of the present invention include oils, such as food oils and oils derived from plant matter, such as fruits, seeds, or legumes. For example, the present invention provides for the use of food oil for scrubbing a waste gas stream of contaminants, and for lubricating compressors at multiple stages of gas compression.

Figure 3:
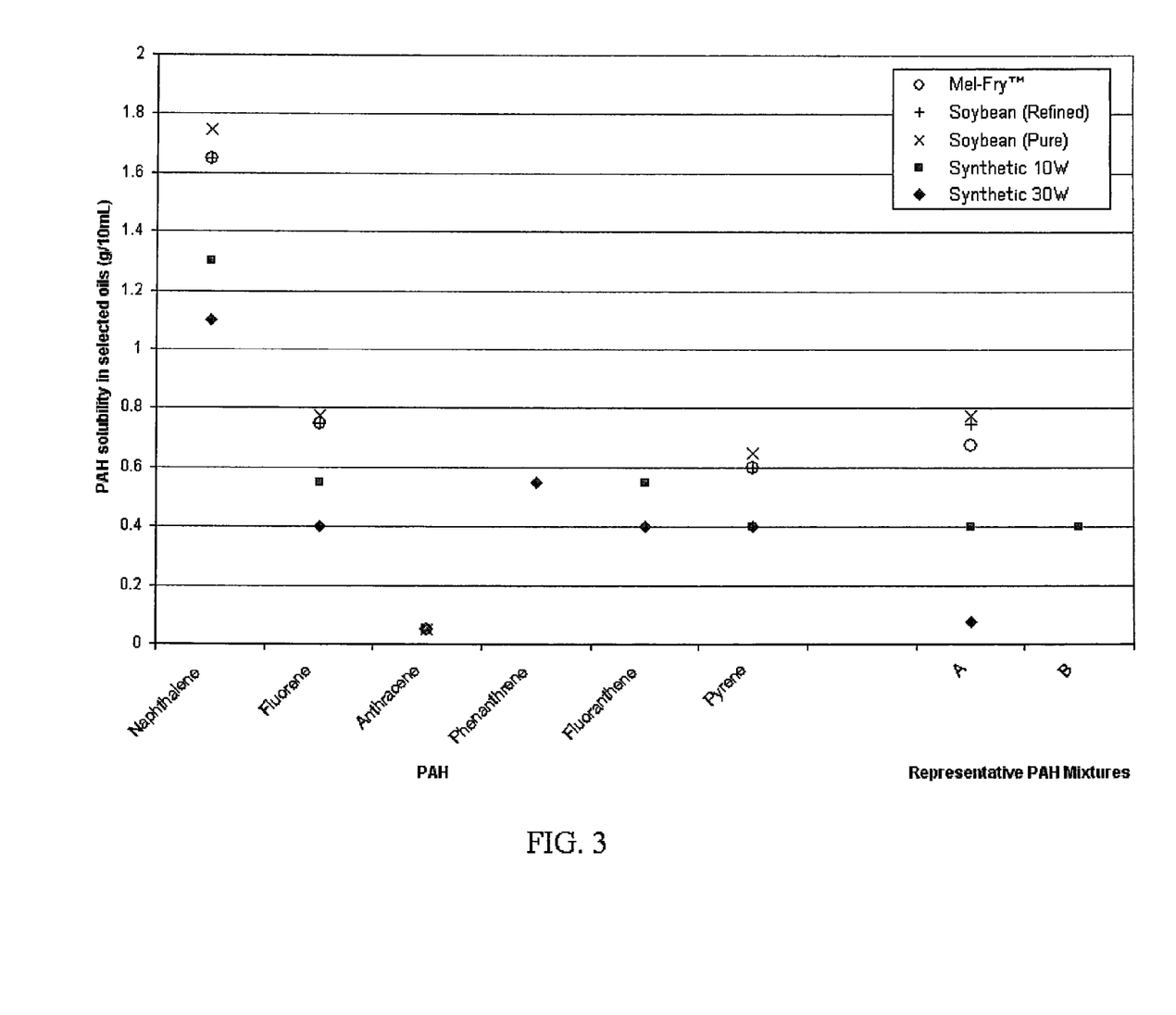
FIG. 3 is a graph showing solubility limits of hydrocarbon contaminants in two different compressor lubricants (i.e. Synthetic 10 W and Synthetic 30 W) and three new scrubbing oils (Mel-Fry™, Refined Soybean, and Pure Soybean) at room temperature.

It has been determined that different solvents, such as oil, have different solubilities for representative PAH found in contaminated gas streams. Further, specific oils can have varying degrees of miscibility with paraffins and olefins that may also be present in the gas streams. FIG. 3 shows the solubility limits of common hydrocarbon contaminants in two different compressor lubricants (i.e. Synthetic 10 W and Synthetic 30 W) and three new scrubbing oils (Mel-Fry™, Refined Soybean, and Pure Soybean) at room temperature.

The lower melting point contaminants such as naphthalene have higher solubility limits in room temperature lubricant that the higher ones. Further, in this example, the lower viscosity lubricant advantageously dissolved a greater proportion of contaminants. Because different gas streams may carry different contaminants, it is not possible to identify a preferred lubricant for all cases; however it is advantageous to establish the solubility limits to ensure that the lubricant chosen has an adequate ability to dissolve the contaminants in question at the temperatures of interest. All of the contaminants illustrated in FIG. 3 dissolved completely in both lubricants at 100° C. at the 1 g/10 mL concentration level. Therefore, the local prevention of fouling within the compression system according to the present invention can be affected by the relative amounts of lubricant and contaminant flow, the temperature of the lubricant and contaminant mixture, the local concentration of the contaminant, and the chemical composition of the lubricant.

Table 1 below lists the solubilities of a representative variety of PAH (based on the following composition by weight: naphthalene (42%), fluorene (32%), anthracene (9%), phenanthene (9%), fluoranthene (5), and pyrene (3%)) in conventional oils and new oils. This, and a second different representative mixture, are included in FIG. 3.

TABLE 1

| Oil Type | g/L |
| --- | --- |
| Naphthalenic 30W | 7.75 |
| Synthetic 30W | 7.75 |
| Naphthalenic 10W | 17.5 |
| Synthetic 10W | 42.5 |
| Canola (refined - R) | 65.0 |
| Olive Oil (R) | 67.5 |
| Mel-Fry ™ (R) | 67.5 |
| Corn (pure - P) | 67.5 |
| Sesame (P) | 70.0 |
| Safflower (P) | 72.5 |
| Canola (P) | 77.5 |
| Soybean (R) | 77.5 |
| Soybean (P) | 77.5 |
| Mel-Fry ™ with AMSOIL Sliplock ™ | 65.0 |
| Soybean (R) with AMSOIL Sliplock ™ | 65.0 |
| Soybean (P) with AMSOIL Sliplock ™ | 65.0 |
| D-Limonene | 70.0 |
| Bio-Air AC 30 | 50.0 |

It has further been found that the addition of wear-resisting additives such as AMSOIL Sliplock™ does not materially reduce the advantage in solubility possessed by the oils of the present invention. Other additives to perform such actions as enhance solubility, such as drying agents (i.e. NaOH), anti-oxidants and biocides (i.e. BHT-butylated hydroxy toluene), anti foaming agents (i.e. silicones), and detergents and dispersants (i.e. d-limonene) may also be included. It was found that metal deactivators used to stabilize fluids by deactivating metal ions decrease the ability of the new oil to dissolve PAHs.

Also, the naturally lower levels of metal ions in the new oil decrease the need for metal sequestration. It is possible that some of the inventive oils, such as d-limonene, which has high detergency, or other molecules with high detergency, can be added to the inventive oils to provide enhanced cleaning of deposits from the gas recycling equipment. The new oil maintains improved corrosion inhibition, extreme pressure durability, and undergoes less significant changes in pour point and viscosity over a broad temperature range. Various additives were found to exhibit the following effects:

zinc phosphates—used in synthetics and naphthalene oil (0.1 to 0.2% by volume) for improved lubrication. Also used to test effects of synthetic oil contamination in food oil's ability to absorb PAHs and other large hydrocarbons.

d-limonene—e.g., orange peel degreaser, exhibits very rapid dissolution of PAHs as well as various greases. Ability to dissolve PAHs is similar to most food oils. This oil has a very low viscosity and is volatile.

The new oils will dissolve the PAH to saturation|, leaving any additional PAHs as precipitates. When PAHs are dissolved under high temperature, oil solubility is increased.

Returning supersaturated oil to ambient temperatures causes the PAH to precipitate. The heavier-than-oil precipitates collect in a homogeneous mass. If the supersaturated oil continues to mix, the precipitates remain in suspension. High volumes of precipitates in a cooled oil and PAH mixture the oil form a highly viscous gel. The viscosity properties of some oils that may be used as the solvent in the invention are described below in the Table 2.

TABLE 2

| Oil | PAH saturation (%) | Viscosity (cSt) at 30° C. | Viscosity (cSt) at 100° C. |
|---|---|---|---|
| Mel-Fry | 0 | 77.1 | 24.1 |
|  | 50 | 52.2 | 23.4 |
|  | 100 | 51.9 | 23.3 |
|  | 350 | 55.2 | 23.2 |
| Synthetic 10W | 0 | 73.15 | 23.4 |
|  | 25 | 66.1 | 22.9 |
|  | 100 | 51.1 | 21.8 |
|  | 300 | 85.0 | 23.0 |

Refined soybean oil is partially hydrogenated soybean oil. Highly refined soybean oil is refined soybean oil hydrogenated to a greater degree. Herein the term "source gas" refers to the waste or used gas stream exhausted from a metals treatment or other process that is typically vented to the atmosphere or used in its impure form, such as the stream (22) exiting the furnace 10 in FIG. 1. "Product gas" refers to the purified gas (hydrogen or other gases such as helium or argon) refined in the recycling process. "New scrubbing oil" and "new lubricating oil" refer to the same material, which are used for gas purification in the present invention.

As described above with respect to the structure depicted in FIG. 2, the solvent oil is used as a gas stream scrubber and gas compressor lubricator. This method of operation recovers about 1.82 times as much PAH in relation to standard mineral oil. Besides acting as a waste gas scrubber and lubricant, the oil cleans the compressor and valves of mineral oil and PAH.

The solvent used in the apparatus and method of the invention is preferably an oil. The oil may be a synthetic oil, a mineral oil such as an oil derived from petroleum, and/or a naturally occurring oil obtained from plants, or mixtures of said oils (e.g., the solvent used in the stripping portion of the apparatus).

Synthetic oils include materials that have straight hydrocarbon chains with no branching or a degree of branching wherein less than 1% of the carbon atoms of the hydrocarbon chain are branching carbon atoms bonded to more than two other carbon atoms, where % is based on the total number of carbon atoms in the chain and the number of branching carbon atoms present on the chain. Synthetic oils may have unsaturation along the hydrocarbon chain or at branching of the hydrocarbon chain. Synthetic oils may include star-branched oils and dendrimers.

The synthetic oils may contain from 12-50 carbon atoms. Preferably, the synthetic oils contain from 16-30 carbon atoms. In a more preferable embodiment, the synthetic oils are materials having straight, unbranched carbon chains of from 16 to 30 carbon atoms.

Preferably, the synthetic oils are saturated and do not include any olefinic or acetylenic bonds. Preferable synthetic oils are represented by the chemical formulas $C_{16}H_{2n+2}$—$C_{30}H_{2n+2}$. Even more preferably, the synthetic oils contain no aromatic substitution, e.g., the synthetic oils contain no aromatic hydrocarbon or heterocarbon groups. Representative commercially available synthetic oils that may be used as the solvent of the invention include Fuchs lubricant co., Synshield Compound 32.

In other embodiments of the invention the solvent may be a mineral oil. A mineral oil is a hydrocarbon material derived from a petroleum source such as crude oil. The mineral oils that may be used as the solvent of the invention are typically purified, for example, by one or more distillation processes whereby the components of a petroleum mixture such as a crude oil mixture are separated according to their relative boiling points, membrane permittivity, or by a chemical means. The mineral oil solvent of the invention is preferably a mineral oil that has undergone one or more purification processes such as desulphurization to remove undesired hetero-atom-containing materials.

Preferably, the solvent of the invention is an oil derived from plants, e.g., an oil such as a food oil. Food oils may have one or more substituent groups such as fatty acids. Examples of saturated food oils include fatty acids such as butyric acid, hexanoic acid, caprylic acid, decanoic acid, lauric acid, myristic acid, palmitic acid, stearic acid, arachidic acid, and behenic acid. The substituent groups may be present on a hydrocarbon chain at either backbone or branching positions. The food oils may be of formula $R(B)_x$ where R is a linear or branched aliphatic group that is a chain of units made from carbon and hydrogen atoms and B is one or more heteroatom-containing groups. Preferred food oils include oils having one or more fatty acid groups of formula —COOH and/or esters of fatty acid groups of formula —COOR$^1$. The R$^1$ group of a fatty acid ester group may be an alkyl group having from 1-24 carbon atoms, preferably 4-18 carbon atoms, most preferably from 6 to 12 carbon atoms. The alkyl group of the ester unit may be further substituted with one or more heteroatom groups and/or have one or more unsaturated bonds between carbon bonds. The R$^1$ group is preferably a linear or non-branched hydrocarbon chain. Most preferably the R$^1$ group is a hydrogen atom.

Preferably there is one fatty acid group of per hydrocarbon chain located at a terminus of the hydrocarbon chain. In other embodiments, one or more additional fatty acid groups may be substituted at a second terminus or may be substituted at one or more positions along the backbone of the hydrocarbon chain.

In embodiments of the invention, a food oil that has been subjected to hydrogenation may be used as the solvent. Hydrogenation includes treating the oil with hydrogen in the presence of a catalyst in order to remove or reduce the degree of unsaturation.

The amount and degree of unsaturation present in the hydrocarbon chain and/or any alkyl ester chain may vary. The degree of unsaturation may be measured by an analysis such as iodine value. In some aspects of the invention a food oil having an iodine value of less than 300, less than 200, or from 50 to 150 may be used.

The solvent may also be described by its saponification value which may be used as a measure of the degree of unsaturation of the hydrocarbon chain. There is no limit to the saponification value of the food oil solvent. Food oils having saponification values of less than 500, less than 400, less than 300, or less than 200 may also be used. In some embodiments, the saponification value of the naturally occurring food oil is from 50 to 250. For tall oils the method ASTM D5768-02 (2006)—Standard Test Method for Determination of Iodine Value of Tall Oil Fatty Acids may be used to determine the iodine value. For natural and synthetic drying oils and their fatty acids the method ASTM D 1959 may be used to determine the iodine number.

Food oils including unsaturated groups in the hydrocarbon chain or as part of an ester group substituting a hydrocarbon chain may have a non-linear structure. Such non-linear structure may be due, at least in part, to the presence of olefinic groups which have cis and/or trans orientation around the unsaturated group. In embodiments the food oils of the invention include food oils that are fully saturated and have heteroatom-containing groups at only one position of the chain, or at a terminal position along the chain. In a related embodiment of the invention both the hydrocarbon chain and any hydrocarbon group of an ester substitutent of the oil is saturated, linear and not branched.

A characteristic of most naturally occurring oils is that an even number of carbon atoms occurs in the hydrocarbon chains. Food oils that are chemically modified and/or derived from non-natural sources that have essentially equal amounts of even and odd numbered carbon chains may also be used as the solvent of the invention. In one embodiment the food oil has the following chemical formula: $CH_3(CH_2)_nCOOH$ having no branching and having only a single heteroatom-containing group located at a terminus of the molecule. In different aspects of the invention the food oil contains at least 95% or 100% by weight of components corresponding to the above-mentioned formula based on the total weight of the oils present in the solvent.

In other embodiments the food oil may be an omega unsaturated fatty acid. Omega fatty acids have one or more unsaturated groups along the hydrocarbon chain. Such unsaturation may include alkenyl unsaturation, however, alkynyl-unsaturation may also occur. Unsaturated food oils such as omega food oils may have unsaturation at various positions along the hydrocarbon chain. For example, omega 3-, omega 6-, and omega 9-fatty acid oils may be used as the solvent of the invention. An omega 3-fatty acid oil includes unsaturation at the 3 position along the hydrocarbon chain, e.g., acids as alpha-linolenic acid, stearidonic acid, eicosapentaenoic acid, and docosahexaenoic acid. Omega 6-fatty acids have an unsaturated group at the 6 position and include compounds such as linoleic acid, gamma-linoleic acid, dihomo-gamma linolenic acid, and archidonic acid. Omega 9 fatty acids may also be used, for example oleic acid and erucic acid.

A mixture of food oils may be used as the solvent of the invention. For example, naturally occurring food oils may contain a variety of oils of different carbon number, substitution and physical properties. For example, refined soybean oil contains at least ten different fatty acids. Table 3 describes a soybean oil in terms of its composition related to fatty acids of different carbon number.

TABLE 3

| Fatty acid | No. of Carbon Atoms | % Composition |
|---|---|---|
| Palmitic | 16 | 10.14 |
| Margaric | 17 | 0.11 |
| Stearic | 18 | 4.20 |
| Oleic | 18 | 24.31 |
| Linoleic | 18 | 51.47 |
| Linolenic | 18 | 8.31 |
| Arachidic | 20 | 0.35 |
| Gadoleic | 20 | 0.19 |
| Behenic | 22 | 0.37 |
| Lignoceric | 24 | 0.12 |
| Other | | 0.17 |

The composition of the above described soybean oil may be changed to include oils derived from different plants and/or the above oil may be treated and/or purified using different processes than those used for soybean oil. Thus although some of the same fatty acids in the Table above may be present in different oils or in different oils derived from or refined from soybean oil, similar performance properties may be obtained. For example, the solvent may include any one or more of the fatty acids described in the Table above in amounts of, for example, from 0.01 to 75%, from 0.1 to 50% by weight, or from 10 to 40% by weight. Where ranges are given all values, subranges and values between the stated values are expressly included herein.

The food oil solvent may include a food oil component that includes a mixture of saturated fatty acid having a carbon chain of from 12 to 24 carbon atoms (e.g., of formula $CH_3(CH_2)_nCOOH$ where n is from 10 to 22), one or more omega-3 fatty acids, one or more omega-6 fatty acids, and one or more omega-9 fatty acids. The solvent may be up to 100% by weight of the natural food oil (e.g., an oil extracted from plants) based on the total weight of the oils of the solvent. In other embodiments the solvent is a mixture of the food oil with one or more additional oils such as a synthetic oil or a mineral oil. When used as a mixture with one or both of a synthetic oil and a mineral oil the natural food oil is preferably present in a major amount based on the total weight of the oils.

In embodiments of the invention the food oil solvent has a high boiling point. For example, the solvent of the invention may have a boiling point that is 250° C. or more at 0.05 mm Hg, more than 300° C. at 0.05 mm Hg, more than 350° C. at 0.05 mm Hg, and/or the solvent may be a food oil having a boiling point of greater than 400° C. at 0.05 mm Hg.

In further embodiments the food oil has a melting point below room temperature, such as a melting point of from 15 to 25° C. In embodiments the oil may have a melting point of less than 25° C., less than 20° C., less than 15° C., less than 10° C., less than 5° C., or less than 0° C. Food oils having a melting point of less than –5° C., less than –10° C. or less than –20° C. may also be used in the invention.

In another aspect of the invention the food oil solvent may have a pour point of below 20° C., below 10° C., below 0° C., below –10° C., below –20° C., or below –30° C. Pour point is measured according to ASTM D97.

The food oil preferably does not include any of a gelling agent, a coagulating agent or any additive that increases the melt point of the food oil. Additives such as anti-oxidants that increase the melt point or pour point of the food oil solvent are preferably excluded or are present in amounts that increase the melting or pour point temperatures by no more than 0.5° C. The anti-oxidant TBHQ (tert-butylhydroquinone) is preferably excluded from the food oil. Other additives such as anti-foaming additives including dimethylpolysiloxane are likewise preferably excluded from the food oil solvent. In one embodiment of the invention the food oil solvent consists of dry natural oil extracted from soybeans.

Representative commercially available food oils that can be used as the solvent in the invention include MeI-Fry available from Ventura Foods (e.g., Prod. No. 16502), canola oil such as that available from American Health and Nutrition, and soybean oil such as that available as SLS3322 from ScienceLab.com (e.g., CAS #8001-22-7).

The food oil may have an acid value representative of one or more heteroatom-containing groups substituting the hydrocarbon chain. For example, if the food oil contains one or more fatty acids, the acid number of the oil may be measured or calculated as the amount of free fatty acids or amount of free acid. In embodiments, the amount of free fatty acids does not exceed 1%, 0.1% or 0.05%.

It should be noted that the exemplary embodiments depicted and described herein set forth preferred embodiments and/or further detailed embodiments of the invention, and are not meant to limit the scope of the claims hereto in any way. Numerous modifications and variations of the present invention are possible in light of the above teachings. It is therefore to be understood that, within the scope of the appended claims, the invention may be practiced otherwise than as specifically described herein.

The invention claimed is:

1. A system for recycling a waste gas stream discharged from a heat treatment chamber, said system comprising:
   a recycling apparatus configured to receive the waste gas stream, said recycling apparatus including:
   a supply of solvent;
   a mixing device configured to receive said solvent and mix said solvent with the waste gas stream to dissolve contaminants in the waste gas stream within said solvent, wherein said solvent is a food oil, and
   wherein the mixing device is a compressor in which the solvent and the waste gas stream are mixed, and the solvent is a lubricant for the compressor.

2. The system of claim 1, wherein the food oil comprises one or more selected from the group consisting of a saturated fatty acid oil, an omega 3-fatty acid, an omega 6-fatty acid, and an omega 9-fatty acid.

3. The system of claim 1, wherein the food oil comprises a mixture of a saturated fatty acid oil, an omega 3-fatty acid, an omega 6-fatty acid, and an omega 9-fatty acid.

4. The system of claim 1, wherein the food oil comprises one or more unsaturated fatty acids.

5. The system of claim 1, wherein the food oil comprises one or more fatty acids selected from the group consisting of butyric acid, hexanoic acid, caprylic acid, decanoic acid, lauric acid, myristic acid, palmitic acid, stearic acid, arachidic acid, behenic acid, alpha-linolenic acid, stearidonic acid; eicosapentaenoic acid; docosahexaenoic acid, linoleic acid, gamma-linolenic acid, dihomo-gamma-linolenic acid, arachidonic acid, oleic acid, and erucic acid.

6. The system of claim 1, wherein the food oil is at least one selected from the group consisting of soy bean oil, refined soy bean oil, canola oil, and rapeseed oil.

7. A system for recycling a waste gas stream discharged from a heat treatment chamber, said system comprising:
   a recycling apparatus configured to receive the waste gas stream, said recycling apparatus including:
   a mixing device configured to mix a solvent with the waste gas stream to dissolve contaminants in the waste gas stream within the solvent to form a used solvent;
   a stripping device configured to receive the used solvent and remove all or a portion of the contaminants from the used solvent to form a cleaned solvent; and
   piping configured to transport and inject the cleaned solvent to said mixing device for reuse in said mixing device, and
   wherein the mixing device is a compressor in which the solvent and the waste gas stream are mixed, and the solvent is a lubricant for the compressor.

8. The system according to claim 7, wherein said mixing device is a device in which said solvent flows therethrough in a direction countercurrent to a flow therethrough of the waste gas stream.

9. The system according to claim 7, further comprising a plurality of said mixing devices, wherein said mixing devices include a plurality of compressors connected in series along a gas passage configured to receive and compress the waste gas stream.

10. The system according to claim 7, further comprising a fresh solvent supply configured to inject fresh solvent to said mixing device.

11. The system of claim 7, wherein the food oil comprises one or more selected from the group consisting of a saturated fatty acid oil, an omega 3-fatty acid, an omega 6-fatty acid, and an omega 9-fatty acid.

12. The system of claim 1, wherein the food oil comprises a mixture of a saturated fatty acid oil, an omega 3-fatty acid, an omega 6-fatty acid, and an omega 9-fatty acid.

13. The system of claim 1, wherein the food oil is at least one selected from the group consisting of soy bean oil, refined soy bean oil, canola oil, and rapeseed oil.

14. A method for recycling a waste gas stream discharged from a heat treatment chamber, said method comprising:
   receiving the waste gas stream discharged from the heat treatment chamber; and
   mixing a solvent with the waste gas stream in a mixing device to dissolve or entrap contaminants in the waste gas stream within the solvent,
   wherein said solvent is a natural food oil, and
   wherein the mixing device is a compressor in which the solvent and the waste gas stream are mixed, and the solvent is a lubricant for the compressor.

15. The system of claim 11, wherein the food oil comprises one or more selected from the group consisting of a saturated fatty acid oil, an omega 3-fatty acid, an omega 6-fatty acid, and an omega 9-fatty acid.

16. The system of claim 11, wherein the food oil comprises a mixture of a saturated fatty acid oil, an omega 3-fatty acid, an omega 6-fatty acid, and an omega 9-fatty acid.

17. The system of claim 11, wherein the food oil is at least one selected from the group consisting of soy bean oil, refined soy bean oil, canola oil, and rapeseed oil.

18. A method for recycling a waste gas stream discharged from a heat treatment chamber, said method comprising:
   receiving the waste gas stream discharged from the heat treatment chamber; and
   mixing a solvent with the waste gas stream into a mixing device to dissolve contaminants in the waste gas stream within the solvent to form a used solvent;
   removing all or a portion of the contaminants from the used solvent to form a cleaned solvent; and
   reusing the cleaned solvent by mixing the cleaned solvent with the waste gas stream, wherein the solvent is a food oil, and
   wherein the mixing device is a compressor in which the solvent and the waste gas stream are mixed, and the solvent is a lubricant for the compressor.

19. The method of claim 18, wherein the mixing is carried out at a solvent temperature of 50° C. or less.

20. The method of claim 18, wherein the removing is carried out at a used solvent temperature of 80° C. or higher.

* * * * *

UNITED STATES PATENT AND TRADEMARK OFFICE
CERTIFICATE OF CORRECTION

| | |
|---|---|
| PATENT NO. | : 8,128,737 B2 |
| APPLICATION NO. | : 12/349778 |
| DATED | : March 6, 2012 |
| INVENTOR(S) | : Franklin D. Lomax, Jr. et al. |

It is certified that error appears in the above-identified patent and that said Letters Patent is hereby corrected as shown below:

Title page,
Item [75], Inventors, delete "Owens Owen" and insert --Owen Owens--.

Signed and Sealed this
Twenty-fourth Day of July, 2012

David J. Kappos
*Director of the United States Patent and Trademark Office*